United States Patent [19]

Dubois

[11] 4,301,869
[45] Nov. 24, 1981

[54] STONE PICKING MACHINE

[76] Inventor: Gérald Dubois, 16 Ste-Marguerite, Sherrington, Co. Napierreville, Quebec, Canada

[21] Appl. No.: 140,101

[22] Filed: Apr. 10, 1980

[51] Int. Cl.³ .............................................. A01B 43/00
[52] U.S. Cl. ...................................... 171/63; 56/16.6; 56/364
[58] Field of Search ..................... 171/63, 64; 56/16.6, 56/328 R, 364

[56] References Cited

U.S. PATENT DOCUMENTS

| 2,618,917 | 11/1952 | Howser | 171/63 |
|---|---|---|---|
| 2,706,877 | 4/1955 | Caldwell | 171/63 |
| 2,738,633 | 3/1956 | Bestland et al. | 171/63 |
| 3,100,540 | 8/1963 | Deaver et al. | 171/63 |
| 3,443,644 | 5/1969 | Schindelka | 171/63 |
| 3,529,408 | 9/1970 | Stark et al. | 56/16.6 |
| 3,846,964 | 11/1974 | Frushour et al. | 56/16.6 |

FOREIGN PATENT DOCUMENTS 1059772  8/1979  Canada ................................. 171/63

Primary Examiner—Jay N. Eskovitz

[57] ABSTRACT

A stone picking machine is disclosed. The machine comprises a frame having a draft tongue adapted to be attached to the drawbar of a tractor, a cross-axle with a pair of wheels supporting the frame, a box mounted on the frame, means for picking up stones in the field while the machine is being hauled by a tractor and for loading the stones in the box, and means for raising the box upwardly and for tilting it sidewise to dump the stones into a truck or a pile of stones.

4 Claims, 21 Drawing Figures

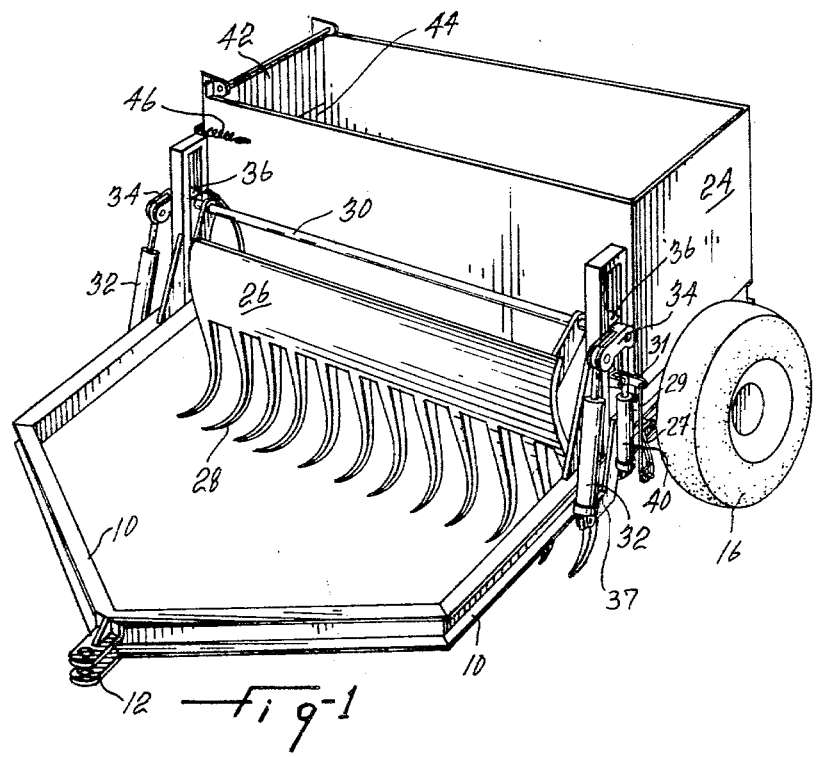
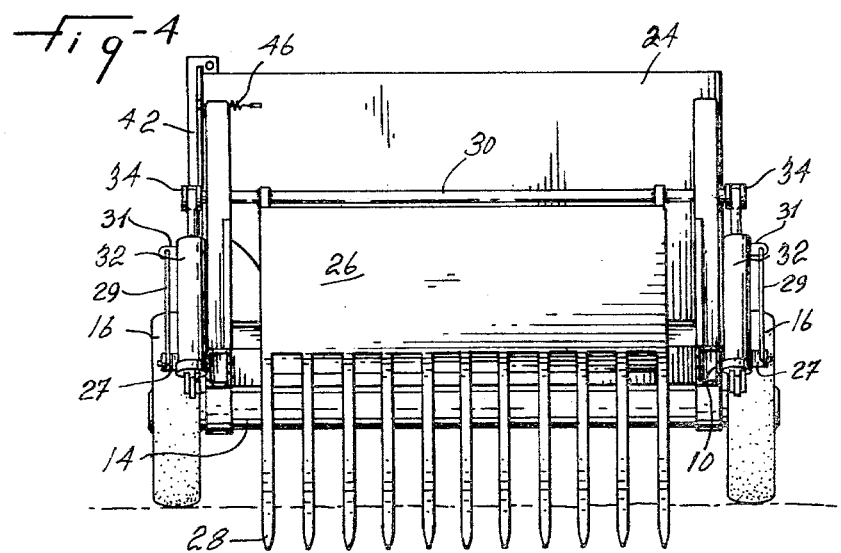

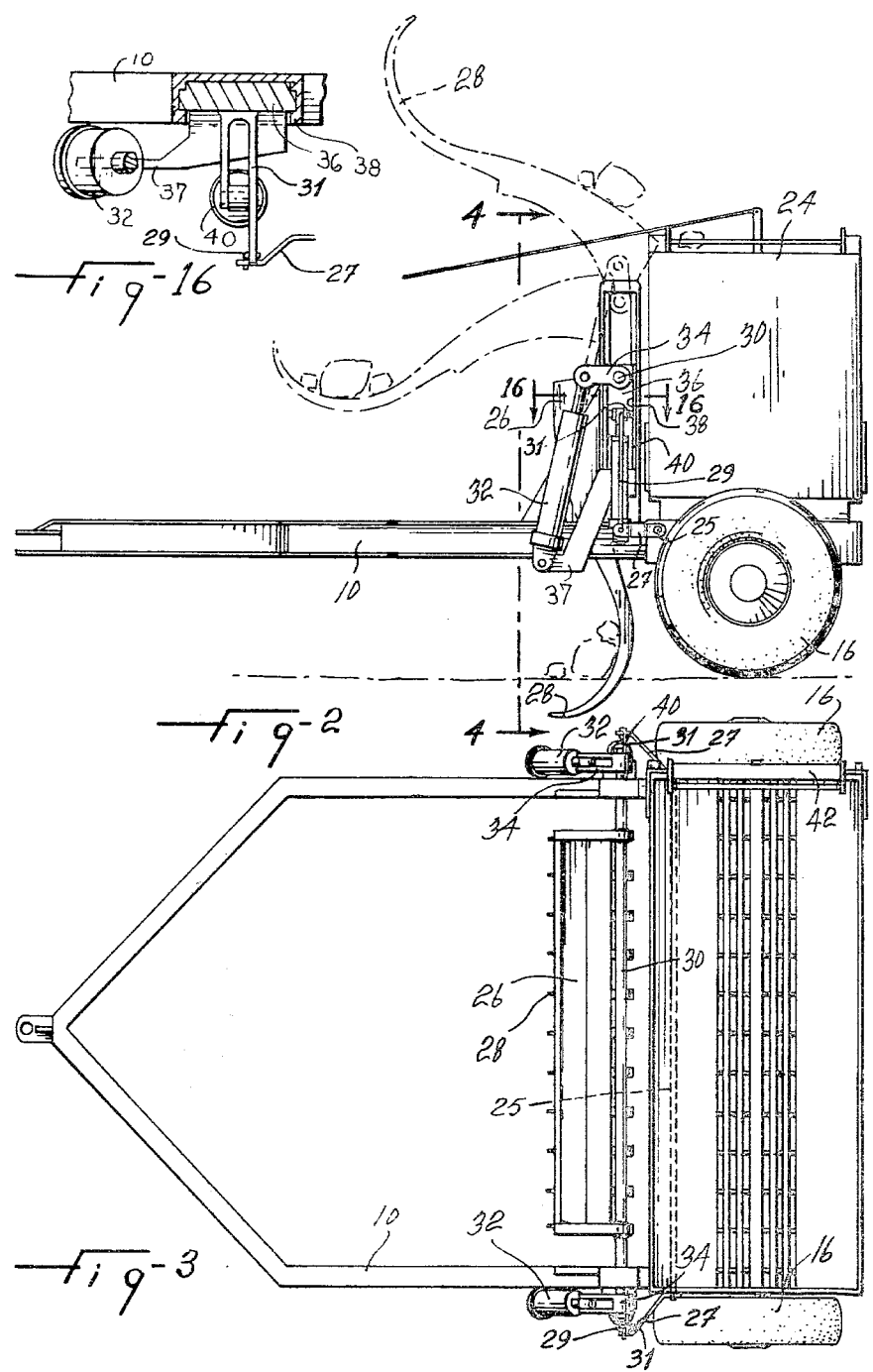

U.S. Patent Nov. 24, 1981 Sheet 3 of 9 4,301,869
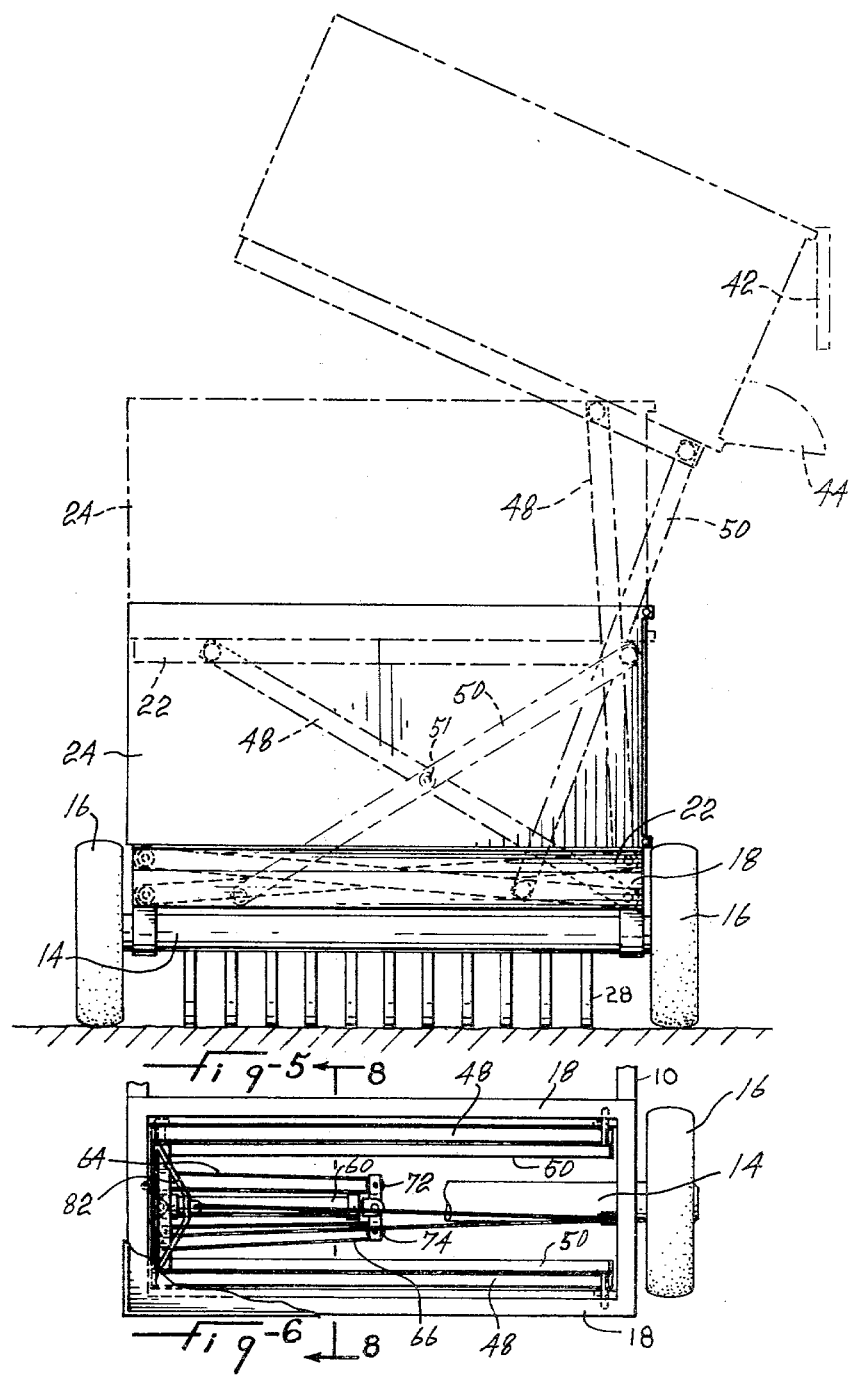

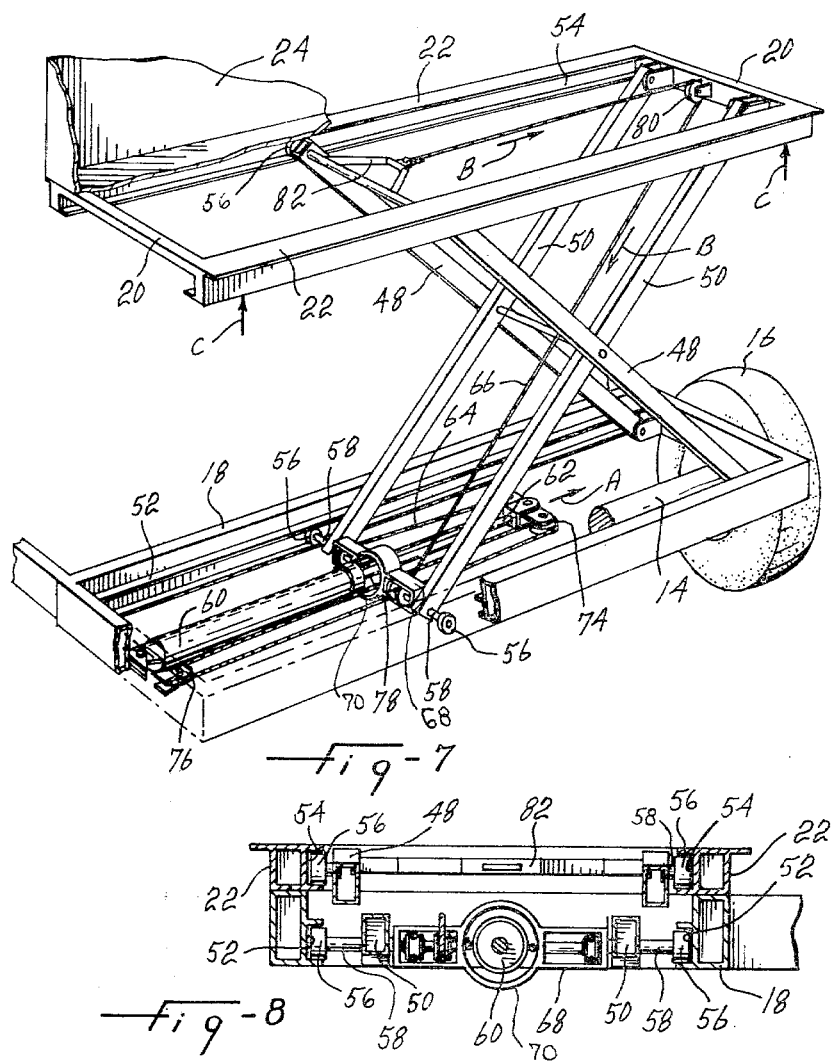

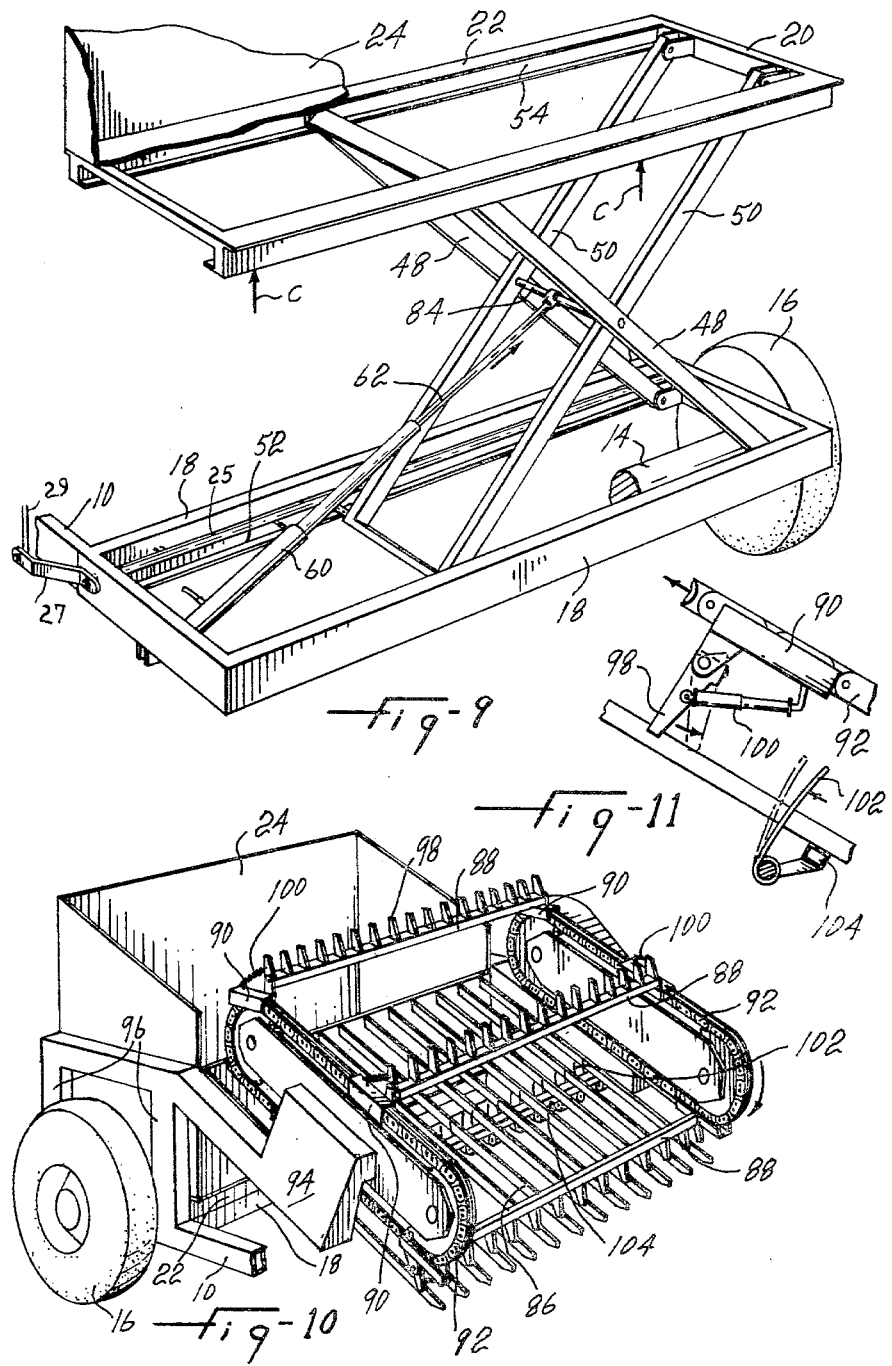

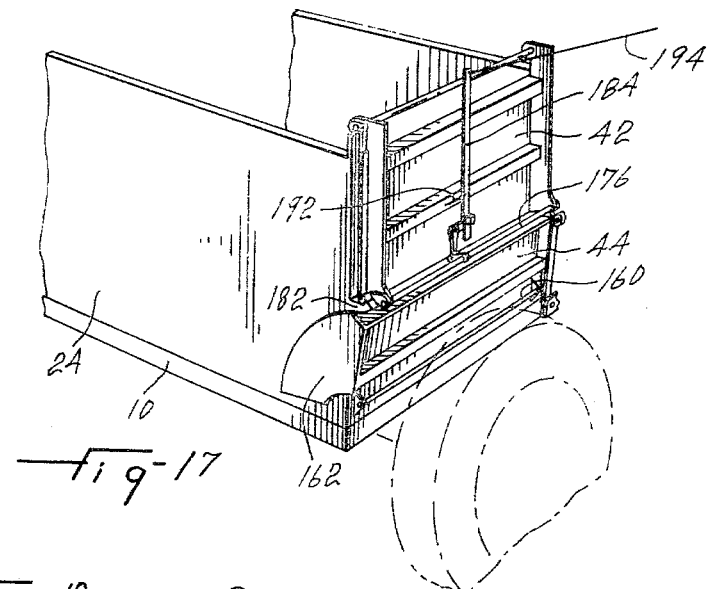
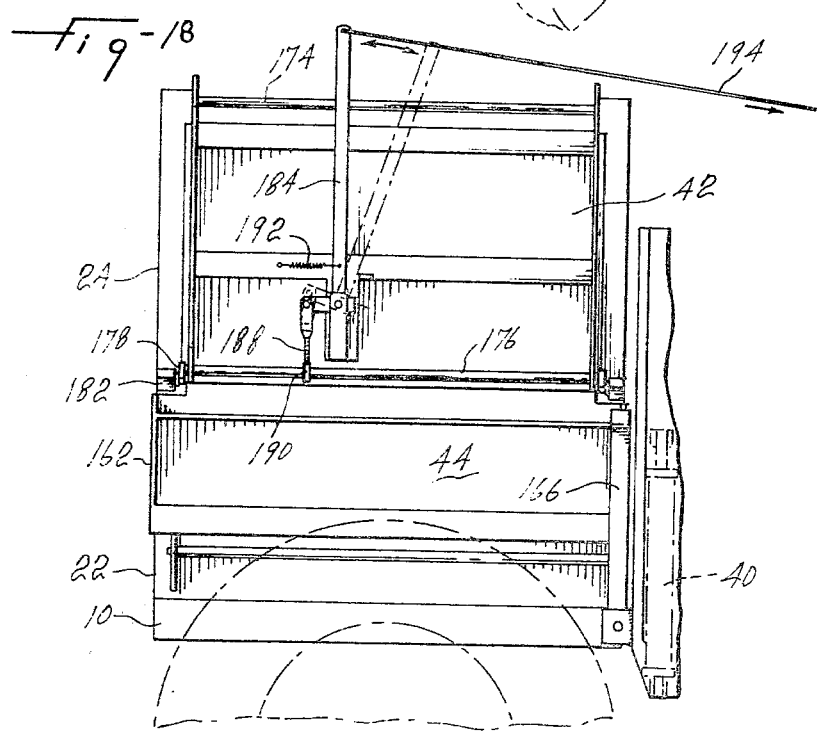

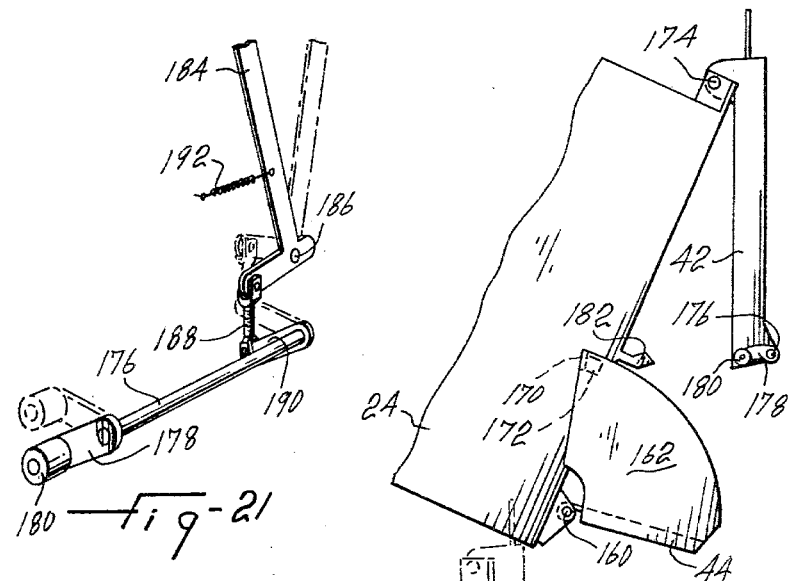
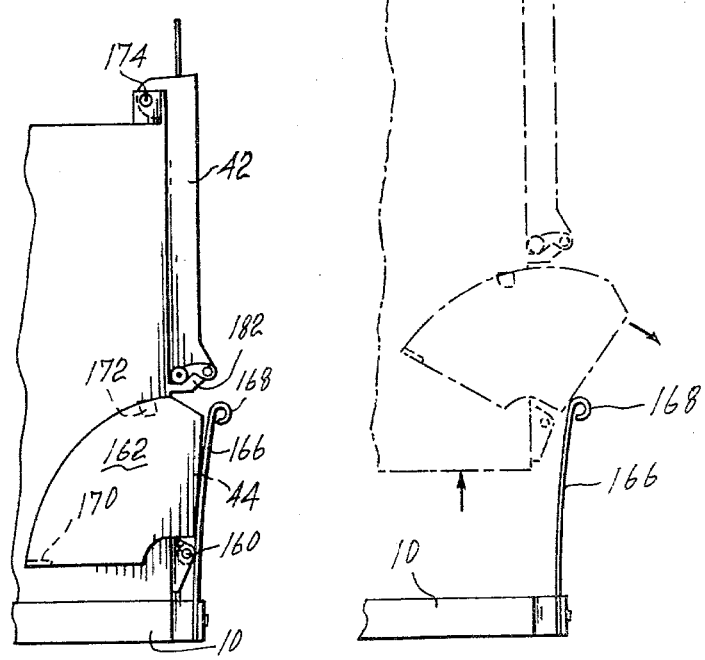
fig-21
fig-19  fig-20

STONE PICKING MACHINE

This invention relates to a stone picking machine for use with ordinary farm tractors to dump the stones into a truck or onto a pile of stones.

Various types of stone picking machines are known. However, the known machines are very complex and, in addition, dump the stones rearwise. In view of the fact that the stone picking is normally done in the spring when the soil is moist and muddy, it is difficult to back a loaded stone picker for dumping rearwardly since the wheels of the stone picking machine or of the tractor have the tendency to dig into the soft soil.

It is therefore the object of the present invention to provide a stone picking machine which dumps the stones sidewise rather than rearwise and, in addition, is of simple and efficient construction and non-costly to build.

The stone picking machine, in accordance with the invention, comprises a frame having a draft tongue adapted to be attached to the drawbar of a tractor, a cross-axle with a pair of wheels supporting the frame, a box mounted on the frame, means for picking up stones in the field while the machine is being hauled by the tractor and for loading such stones in the box, and means for raising the box upwardly and for tilting it sidewise to dump the stones into a truck or onto a pile of stones.

In a preferred embodiment of the invention, the frame has a substantially rectangular fixed frame portion and the box is supported by a movable frame which is superposed on such fixed frame portion. The means for raising the box includes two pairs of linkages located underneath each side of the box with one of the linkages of each pair being pivoted on the fixed frame portion and the other on the movable frame, at one end, and with the other end of the linkages of each pair being slidably mounted one on the fixed frame and the other on the movable frame. The fixed frame portion and the movable frame each have guideways extending longitudinally on each side of the box and such other end of the pairs of linkages carries rollers sliding in such guideways. The means for sliding such other end of the pairs of linkages conveniently comprises a hydraulic cylinder having a piston connected to the linkages. In order to allow tilting of the box to dump sidewise, the linkages which are slidably mounted on the movable frame are longer than the other linkages. The box is preferably provided with a remote controlled door system which automatically closes upon lowering of the box.

In one embodiment of the invention, the means for picking up the stones in the field is a pivotable apron which is pivoted to dump the stones into the box when a certain number of them has been accumulated on the teeth of a rake attached to the lower portion of the apron. In a second embodiment of the invention, the apron slopes down from the edge of the box and a series of rake bars are provided for sweeping the stones upward on the apron and into the box. This embodiment is advantageous in that it does not require stopping of the stone picking machine for loading.

The stone picking machine may additionally be provided with a rake mounted at least on one side of the frame for channelling the stones to the picking machine. The rake is preferably supported on wheels which are adjustable in height so as to control the depth of the rake into the soil. Means are also preferably provided for vibrating the teeth to assist in channelling the stones to the stone picking machine.

The invention will now be disclosed, by way of example, with reference to the accompanying drawings in which:

FIG. 1 is a perspective view of a stone picking machine in accordance with the invention;

FIG. 2 is a side elevation view of the stone picking machine shown in FIG. 1;

FIG. 3 is a plan view of the stone picking machine illustrated in FIG. 1;

FIG. 4 is a view taken along line 4—4 of FIG. 2; FIG. 4 is located on the sheet of drawings containing FIG. 1;

FIG. 5 is a rear view of the stone picking machine illustrating the box in dashed lines as it is raised to its upward position;

FIG. 6 is a top view of the stone picking machine with the box removed so as to illustrate the mechanism for raising the box;

FIG. 7 illustrates a perspective view of the stone picking machine as the mechanism for raising the box is operated;

FIG. 8 illustrates a section view taken along line 8—8 of FIG. 6;

FIG. 9 illustrates a view similar to FIG. 7 but using a slightly different mechanism for raising the box;

FIG. 10 illustrates a second embodiment of the means for picking up the stones in the field;

FIG. 11 illustrates an enlarged view of a portion of the stone picking arrangement of FIG. 10;

Figure 12:
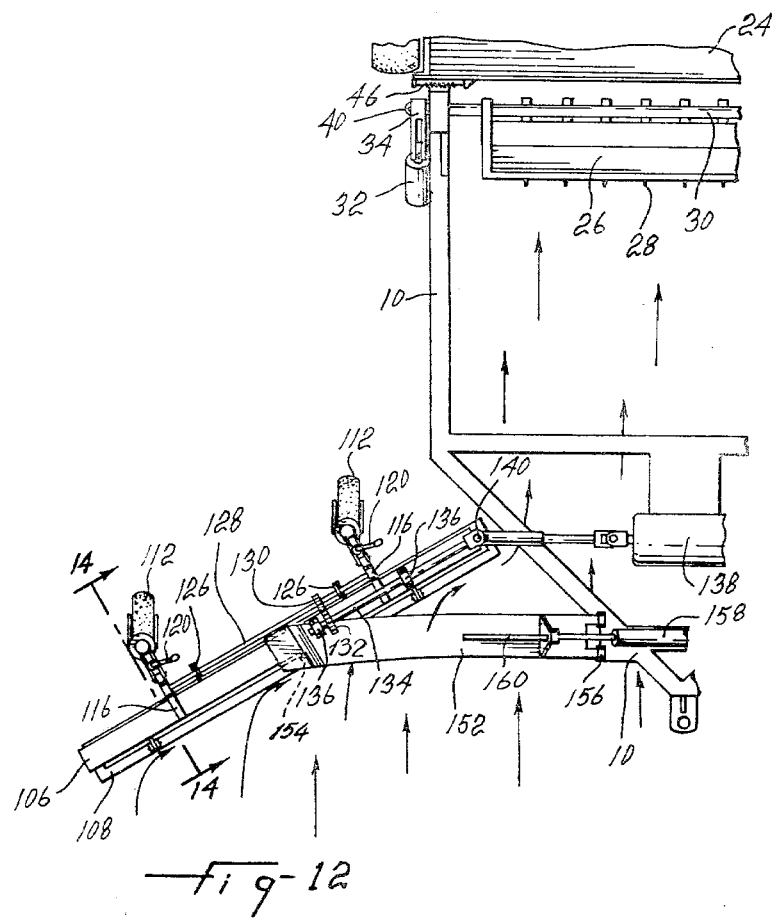
FIG. 12 illustrates a top plan view of a rake mounted on one side of the frame of the stone picking machine for channelling the stones to the picking machine.

FIG. 16, seen on the sheet containing FIGS. 2 and 3, is a cross-section view taken along line 16—16 of FIG. 2;

FIG. 17 is a partial perspective view of the box showing the door system in closed position;

FIG. 18 is an elevation of the box and door system;

FIGS. 19 and 20 are side elevations of the door system in closed, partially open and fully open positions; and FIG. 21 is a partial perspective view of the remote controlled door latching mechanism.

Referring to FIGS. 1-8 of the drawings, there is shown a first embodiment of the invention comprising a frame 10 having opposite sides converging to form a draft tongue 12 at the front. The frame is supported by a cross-axle 14 at the end of which are mounted ground engaging wheels 16. The back of the frame has two parallel cross-members 18 forming with a portion of the sides of the frame a substantially rectangular frame portion. A movable frame having two end members 20 and two cross-members 22 is superposed on the above rectangular frame portion. Such movable frame supports a box 24 for receiving the rocks as it will be disclosed later.

An apron 26 provided with elongated teeth 28 is pivotally mounted in front of the stone picking machine for picking up the stones in the field while the machine is hauled by a tractor and for dumping the stones into the box 24. The apron is pivoted on blocks 36 by means of a rod 30, crank arm 34 and a hydraulic cylinder 32 secured on each side of the frame 10 to an extension 37 of block 36. Hydraulic cylinders 32 are conveniently powered by the hydraulic system of the tractor. Apart from being pivoted around rod 30, the apron 26 is also movable vertically by means of blocks 36 which are bearings for the rod 30 and adapted to slide on a guide track 38 under the control of a hydraulic cylinder 40 having its piston connected to the block. Cylinders 40, one on each side, are also conveniently operated by the hydraulic system of the tractor. In order to insure equal vertical movement of blocks 36 one on each side of the frame 10, they are linked by a stabilizer rod 25 journalled within and extending transverse frame 10 along cross-member 18; arms 27 are secured to the ends of rod 25 and pivotally connected by links 29 to brackets 31 secured to blocks 36, brackets 31 serving also to connect cylinders 40 to blocks 36 (see FIGS. 1, 2, 3, 16 and 9). One of the side walls of the box is made in two door sections 42 and 44 which are pivoted at the top and bottom and held in closed position by means described hereinafter.

The movable frame is raised and tilted sidewise by means of two pairs of linkages 48 and 50 located underneath each side of the box 24 in the rest position of the box. Linkages 48 and 50 are pivotally interconnected at 51 intermediate their ends. They are pivoted at one end on the fixed frame portion 18 and the movable frame 22, respectively, while the other end of the linkages 48 and 50 is slidably mounted in guides 52 and 54 secured to the inside of cross-members 18 and 22, respectively, by means of rollers 56 which are secured to shafts 58 at the end of each linkages.

The slidable ends of linkages 48 and 50 are moved by a telescopic hydraulic cylinder 60 secured to frame 10 and having its piston 62 connected by means of cables 64 and 66 to linkages 48 and 50. Hydraulic cylinder 60 is also conveniently operated by the hydraulic system of the tractor. Cable 64 is attached at one end to a bracket 68 secured between linkages 50 and having a circular central portion 70 of a diameter large enough to encircle cylinder 60. The cable 64 passes around a pulley 72 mounted on the piston head and is attached at its other end to frame 10. It will be seen that movement of the piston out of the cylinder in the direction of arrow A, as shown in FIG. 7, will automatically move the slidable end of linkages 50 towards the right to move the box 24 upwardly. Cable 66 is also attached at one end to bracket 68 and passes around a pulley 74 mounted on the piston head, around a pulley 76 mounted on the frame, through a pulley 78 mounted on bracket 68, around a pulley 80 mounted on the side 20 of the movable frame and is finally attached at its other end to a rod 82 interconnecting the slidable end of linkages 48. As it will be easily seen, movement of piston 62 out of cylinder 60 will pull the cable in the direction indicated by arrows B and thus also contribute to the moving of box 24 upwardly as indicated by arrows C in FIG. 7. However, in order to allow tilting of the box sidewise, the linkages 48 are made slightly longer than the linkages 50 so that they stand higher than the linkages 50 in the uppermost position and thus move the box 24 to an inclined position as illustrated in dashed lines in FIG. 5 of the drawings.

FIG. 9 illustrates another embodiment of the invention which is similar to the embodiment shown in FIGS. 1-8 and the corresponding elements have been designated by the same reference numerals. The difference between this embodiment and the previously described one is that the piston 62 of cylinder 60 is connected to a rod 84 which is passing through linkages 48 and 50. The portion of linkages 48 extending upward from rod 84 is slightly longer than the one of linkages 50 so as to allow tilting of the box sidewise in the raised position of the box.

FIGS. 10 and 11 illustrate another embodiment of the invention which is also provided with the fixed and movable frames 18 and 22 but wherein a different device is used for picking up the stones. In this embodiment, the apron 86 is sloping upwardly up to the edge of the box and the stones are moved up the apron by a series of rake bars 88 mounted on channels 90 which are attached to a pair of chains 92. The chains are powered by hydraulic motors (not shown) conveniently connected to the hydraulic system of the tractor and supported above the apron by means of supports 94 secured to post 96 extending upwardly from frame 10. As illustrated more clearly in FIG. 11, the teeth 98 of the rake bars are pivotally mounted on channels 90 and loaded by springs 100 which allow pivoting of the teeth in case of overload, such as overfilling of the box 29. The apron is also provided with resilient fingers 102 which are regularly spaced along a cross-bar 104 and set into vibration by the passing stones to break the chunks of earth which may be picked up with the stones.

FIGS. 12-15 illustrate a rake assembly which may be mounted on the frame of the above disclosed machine for channelling the stones to the apron of the machine. The rake assembly consists of a box frame 106 which supports a rake 108 provided with a series of teeth 110. The frame 106 is supported on the ground by swivel wheels 112 mounted for rotation of their spindle 113 in an upright tube 114 which is connected to box frame 106 through two L-shaped brackets 116 provided with arms 118 forming a deformable parallelogram with tube 114. A handle 120 is rotatably mounted on each upper arm 118 and threaded into a member 122 secured to the L-shaped bracket 116 such as to permit adjustment of the height of the rake with respect to the ground.

Figure 13:
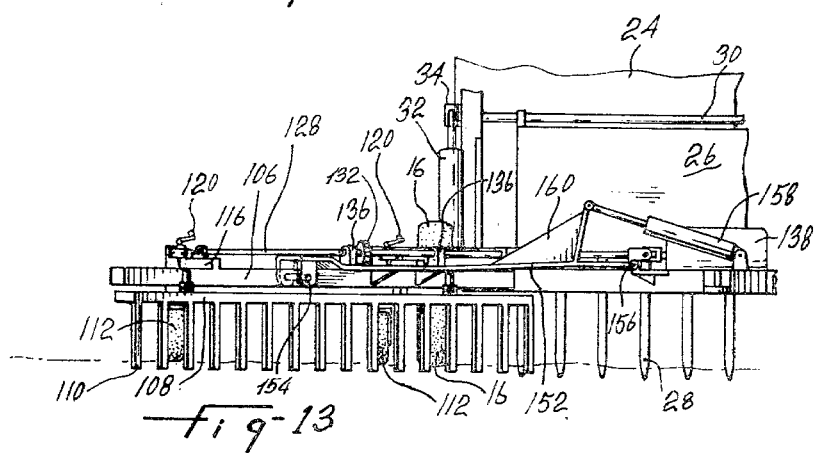
FIG. 13 is a front elevation view of the rake of FIG. 12.
Figure 14:
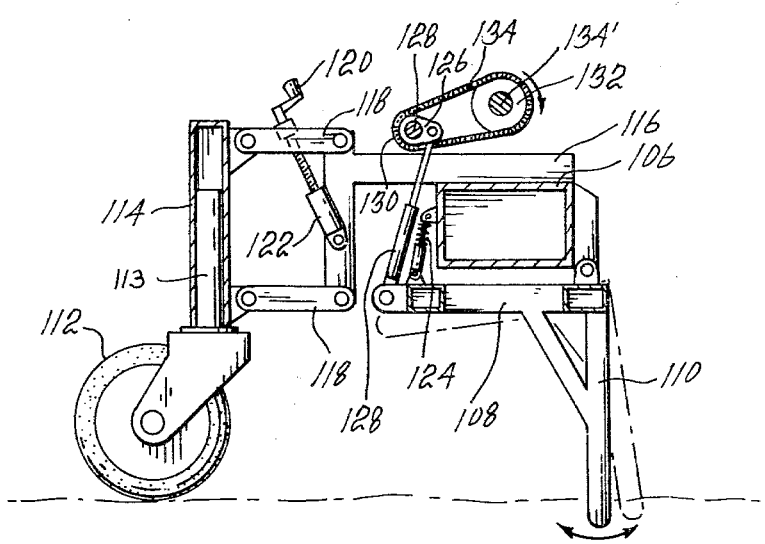
FIG. 14 is a section view taken along line 14—14 of FIG. 12.
Figure 15:
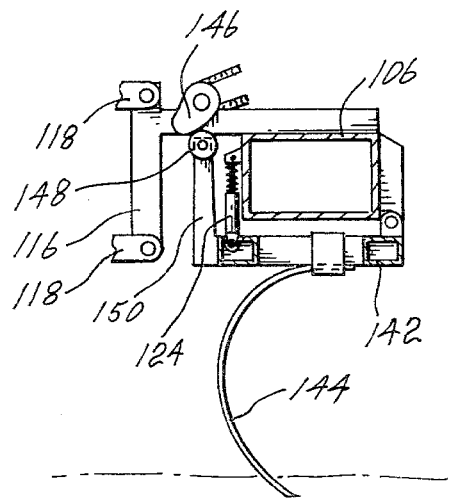
FIG. 15 is a partial view of another embodiment of an arrangement for vibrating the teeth of the rake.

The rake 108 is pivotally mounted on the box frame 106 and held in a rest position by springs 124. As shown in FIGS. 12-14, the rake is vibrated by two eccentrics 126 through shock absorbers 128. The eccentrics 126 are mounted on a shaft 128 which is rotated by gears 130 and 132 coupled by chain 134. Gear 132 is mounted on a shaft 134' which is journalled in bearings 136 and powered by a hydraulic motor 138 through universal joint 140. Motor 138 is positioned on frame 10 of the stone picking machine. FIG. 15 shows another type of rake 142 provided with teeth 144. The rake is vibrated by cams 142 which contact cam followers 148 mounted on arms 150 forming part of the rake 142.

A support arm 152 is pivoted to the center of box frame 106 by a pivot pin 154 to allow inclination of the rake according to the ground slope.

Arm 152 is pivotally connected at 156 to the frame of the stone picking machine and operated by a hydraulic cylinder 158 through a vertical plate 160 mounted on plate 152. Hydraulic cylinder 158 is also conveniently powered by the hydraulic system of the tractor. Operation of hydraulic cylinder 158 permits raising of the whole rake assembly above the ground during transportation.

The door mechanism for the box 24 is illustrated in FIGS. 17 to 21. The lower door section 44 is pivoted at 160 to the side of the box at its bottom and has lateral sector plates 162 overlapping the walls of the box in the closed position of door section 44. When box 24 is in lowered position on frame 10, door section 44 is kept closed by an upstanding leaf spring 166 which is secured to frame 10 at its lower end. Leaf spring 166 has a curved upper end 168 sliding over lower door section 44 and closing the same upon lowering of the box 24. Door section 44 is so weighted that it automatically opens when box 24 moves up and door section 44 clears leaf spring 166. Tabs 170 depending from sector plates 162 abut lugs 172 on box 21.

Upper door section 42 is freely hung at 174 to the top of the box and automatically opens and closes under gravity, depending on the tilted and horizontal position respectively of box 24.

A latching mechanism is provided to latch upper door section 42 in closed position. A shaft 176 is journalled along the lower free edge of door section 42 and a lever 178 carrying a roller 180 is secured to each end of shaft 176. Rollers 180 are adapted to roll over and engage behind hooks 183 secured to box 24.

A L-shaped lever 184 is pivoted at the junction of its arms at 186 to door section 42; its shorter arm is connected by an adjustable link 188 to an arm 190 secured to shaft 176. A tension spring 192 is attached to the longer arm of lever 184 and resiliently maintains the latter in a pivoted position in which rollers 180 are pressed down behind hooks 182 to latch the door. A rope 194 is attached to the top end of lever 184. A rope 194 is attached to the top end of lever 184 and is accessible to the tractor driver who may pull on the rope to release the door section 42. The latter automatically latches in closed position when the box returns to the horizontal.

Although the invention has been disclosed with reference to preferred embodiments, it is to be understood that it is not limited to such embodiments but by the scope of the claims only. For example, other means could be used for picking up the stones in the field while the machine is being hauled by the tractor and for loading the stone into the box. In addition, other means of moving the box upwardly and tilting sidewise are also envisaged. Finally, the stone picking machine may be used with or without the side rake.

What I claim is:

1. A stone picking machine adapted to be hauled by a tractor comprising:
   (a) a frame having a draft tongue adapted to be attached to the draw bar of the tractor;
   (b) a cross axle with a pair of wheels supporting the frame;
   (c) a box mounted on said frame;
   (d) means for picking stones in the field while the machine is being hauled by the tractor and for loading such stones in the box; and
   (e) means for raising said box upwardly and for tilting it sidewise to dump the stones into a truck or onto a pile of stones;

said frame having a substantially rectangular fixed frame portion, a movable frame supporting said box and superposed on said fixed frame portion, the latter and said movable frame each having guide ways extending longitudinally thereof on each side of the box, and wherein said means for raising said box includes two pairs of scissors linkages located underneath each side of the box, both linkages in each pair being pivotally interconnected intermediate their ends, one of the linkages of each pair having one end pivoted on the fixed frame portion and the other linkage having one end pivoted on the movable frame on the ends of said frames where stone dumping takes place, and with the other end of the linkages of each pair carying rollers sliding in the guide ways of the fixed frame and in the guideways of the movable frame, the linkages which are slidably mounted in the movable frame being longer than the others so as to allow tilting of the box to dump sidewise, and power means for sliding said rollers in said guideways.

2. A stone picking machine as defined in claim 1 wherein said power means include a hydraulic cylinder connected between set fixed frame portion and a rod interconnecting said pairs of linkages intermediate the ends of said linkages.

3. A stone picking machine as defined in claim 1 wherein the means for picking up the stones in the field is an apron having ground engaging teeth at its lower edge and which is pivoted in bearing blocks to dump the stones in the box when a certain number of stones have been accumulated by the teeth, said bearing blocks being movable up and down in vertical guide tracks and power means to adjust the vertical position of said bearing blocks in said guide tracks and consequently the level of said teeth relative to the ground.

4. A stone picking machine as defined in claim 3 further comprising a rake mounted on and extending away from at least one side of the frame for channelling the stones to the apron teeth, wheels for supporting the rake, means for adjusting the height of the last named wheels so as to control the depth of the rake into the soil and means for vibrating the rake to assist the channelling of the stones to the apron teeth.

* * * * *